United States Patent

Cascione et al.

[11] Patent Number: 5,266,338
[45] Date of Patent: Nov. 30, 1993

[54] EGG PASTEURIZATION

[75] Inventors: Alexander S. Cascione, Lake Hiawatha; Harold Rapp, Denville, both of N.J.

[73] Assignee: Nabisco, Inc., Parsippany, N.J.

[21] Appl. No.: 807,306

[22] Filed: Dec. 13, 1991

Related U.S. Application Data

[63] Continuation-in-part of Ser. No. 686,911, Apr. 15, 1991, Pat. No. 5,096,728.

[51] Int. Cl.$^5$ ............................................. A23J 3/00
[52] U.S. Cl. ........................................ 426/32; 426/47; 426/330.1; 426/614
[58] Field of Search ............... 426/47, 614, 417, 32, 426/330.1, 535, 614, 271, 321, 322, 298, 299, 300, 330.1, 532, 535, 547, 605, 614, 465, 519, 520, 521

[56] References Cited

U.S. PATENT DOCUMENTS

| | | | |
|---|---|---|---|
| 2,776,214 | 1/1957 | Lloyd et al. | 426/335 |
| 3,251,697 | 5/1966 | Lineweaver et al. | 99/161 |
| 3,364,037 | 1/1968 | Mink et al. | 426/614 |
| 3,615,705 | 10/1971 | Kohl et al. | 426/330.1 |
| 3,840,683 | 10/1974 | Strong et al. | 426/177 |
| 3,911,144 | 10/1975 | Strong et al. | 426/588 |
| 3,928,632 | 12/1975 | Glaser et al. | 426/72 |
| 4,060,644 | 11/1977 | Braid | 426/261 |
| 4,103,040 | 7/1978 | Fioriti et al. | 426/614 |
| 4,333,959 | 6/1982 | Bracco et al. | 426/614 |
| 4,808,425 | 2/1989 | Swartzel et al. | 426/399 |
| 4,957,759 | 9/1990 | Swartzel et al. | 426/399 |
| 4,971,827 | 11/1990 | Huang | 426/614 |

FOREIGN PATENT DOCUMENTS 344123 11/1989 Antigua .

OTHER PUBLICATIONS

Mountney, G. J., 1976, Poultry Products Technology, 2nd Edition, p. 332, AVI Publishing Co., Westport, Ct.
Banwart, G. J. Basic Food Microbiology, 1981, p. 88, AVI Publishing Company, Inc. Westport, Ct.
Egg Product Inspectors Handbook AMS, Instruction #910, p. 34 et seq.
U.S.D.A. Egg Pasteurization Manual, ARS 74-78, P. 19 et seq.
Hamid-Samini et al., J. Food Science, 43:132, (1984).
U.S.D.A. Egg Pasteurization Manual, ARD 74-78, p. 11.

Primary Examiner—Joseph Golian
Assistant Examiner—Leslie Wong

[57] ABSTRACT

Egg products, particularly low cholesterol products, are pasteurized by contact with hydrogen peroxide at elevated temperature. The pasteurized egg is then contacted with catalase to convert the peroxide to water and diatomic oxygen, and the oxygen is then removed, preferably by in-line vacuum. The process enables the pasteurization of liquid eggs, particularly those based principally on egg whites, sufficiently to provide a storage-stable refrigerated liquid egg product.

18 Claims, 1 Drawing Sheet

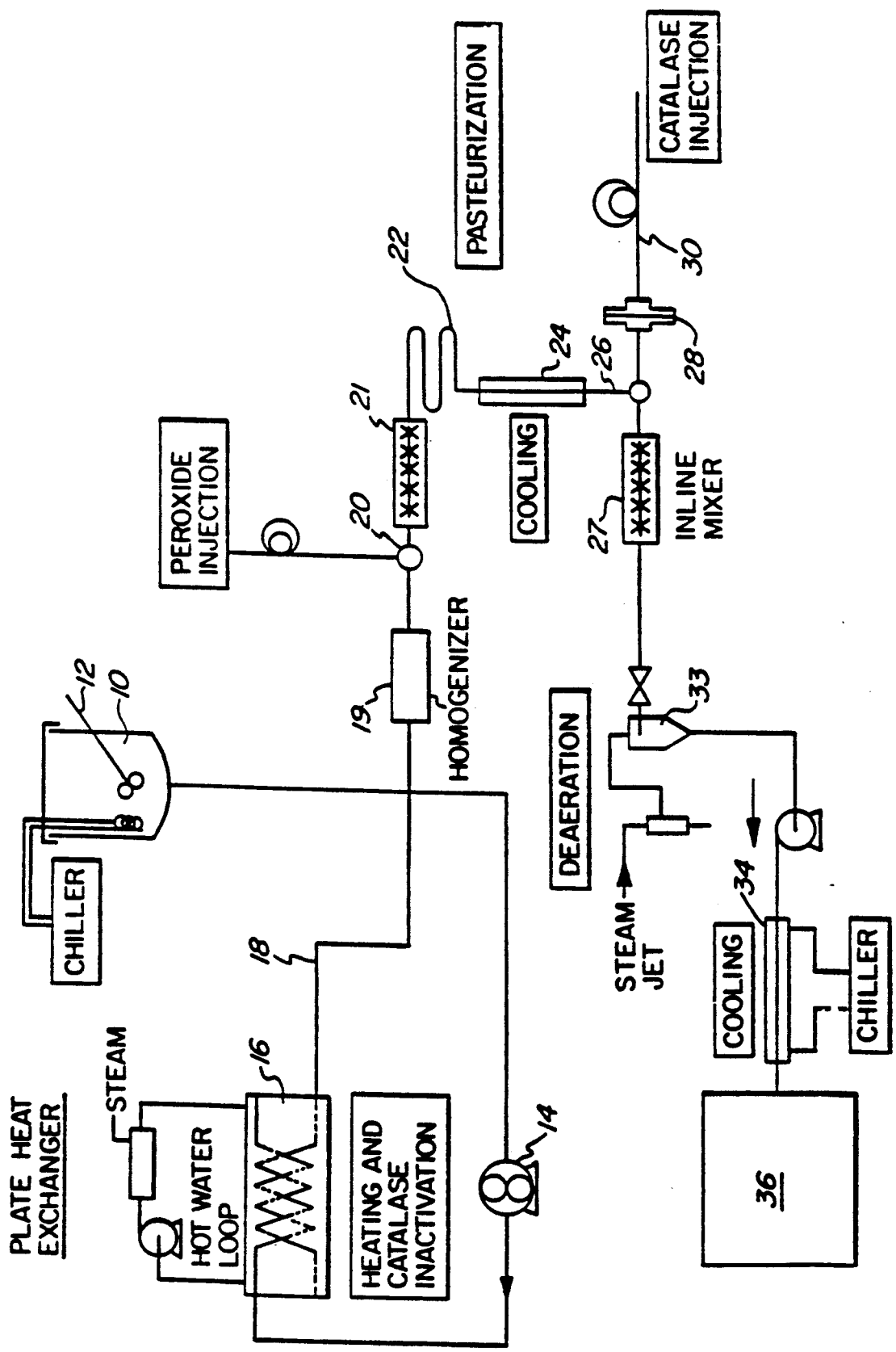

EGG PASTEURIZATION

This application is a continuation-in-part of U.S. patent application Ser. No. 07/686,911, filed Apr. 15, 1991, by H. Rapp, and now U.S. Pat. No. 5,096,728.

BACKGROUND OF THE INVENTION

The invention relates to eggs and, particularly, to the discovery of an improved technique by processing with minimal denaturation to provide a pasteurized egg product having improved stability during refrigerated storage.

Pasteurization employs the controlled application of heat to reduce the population of microorganisms which affect the preservation of food products, such as eggs. Eggs are particularly susceptible to degradation during heating due to the nature of their protein content. They can easily start to congeal and lose other aspects of functionality. The attainment of a product which is functional and can yet be stored in liquid form has been long sought, especially for low cholesterol egg products which don't contain significant levels of natural yolk.

Most commercial egg pasteurization processes are employed primarily to reduce Salmonella to safe levels while bringing spoilage-promoting organisms to levels most suitable for frozen storage. The products of these processes typically permit one to two weeks stability at refrigerator temperatures (e.g., 0° to 4° C.). Until recently, aseptically-packaged, room-temperature stable eggs or refrigerator-stable eggs were not available on a commercial scale.

In an early advance in egg pasteurization, Lineweaver and Cunningham disclosed in U.S. Pat. No. 3,251,697 that the addition of certain polyvalent metal salts enabled increasing the pasteurization temperature several degrees while not adversely affecting the physical properties of the egg.

This process was confirmed as useful by Strong and Redfern in U.S. Pat. Nos. 3,840,683 and 3,911,144 wherein they disclosed a substantially cholesterol and egg yolk-free frozen egg product which had good freeze-thaw stability. These technologies permitted the marketing and wide availability of a health-oriented product highly desired by many egg lovers. When frozen, the products last for extended times. It would be desirable, however, to improve the stability of such products against spoilage when maintained in a refrigerated condition.

Other early disclosures, primarily for frozen and dry egg products, employ hydrogen peroxide to aid in pasteurization. In both U.S. Pat. No. 2,776,214 to Lloyd et al and U.S. Pat. No. 3,364,037 to Mink et al hydrogen peroxide is added to egg prior to heating. The first of these discloses destroying natural catalase by heating the egg white prior to adding the peroxide. The second adds an alkali. A later patent to Kohl et al (U.S. Pat. No. 3,615,705) combines these two teachings. Peroxide has also been employed as a bleach for fish and other food products, shown for example in U.S. Pat. No. 4,060,644 to Braid. Any oxygen produced by these processes is left with the products, its effect on product quality being unknown or disregarded.

More recently, efforts have been made to produce products which remain stable for extended periods of refrigerated or even room-temperature storage. For example, in U.S. Pat. No. 3,928,632, Glaser and Ingerson disclosed an aseptically-packaged, low cholesterol egg product having an additive emulsion which is separately sterilized and homogenized prior to mixing with an egg component. No details of egg pasteurization are provided, but a lactylate salt is an essential ingredient. Similarly, in U.S. Pat. No. 4,971,827, Huang discloses that high temperatures can be employed when turbulent flow is achieved during pasteurization. It would be desirable to provide long shelf lives and process with minimal equipment fouling.

It would be advantageous to have a procedure for assuring low degrees of denaturation with adequate heat treatment for long-term preservation of egg in liquid form at refrigerator temperatures.

SUMMARY OF THE INVENTION

It is an object of the invention to provide a process for pasteurizing liquid egg products under conditions which maximize the reduction of viable organisms while minimizing denaturation of the egg.

It is another object of the invention to provide a refrigerator-stable packaged egg product having a very low level of denatured protein.

It is another object of the invention to improve the processing of liquid egg products which are essentially free of fat and cholesterol.

It is yet another object of the invention to improve current egg processing to provide an improved packaged egg product.

These and other objects are accomplished according to the invention which provides an improved process for pasteurizing liquid egg formulations and improved liquid egg formulations, both pasteurized and unpasteurized.

According to the process of the invention, an improvement is provided in the preparation of a pasteurized liquid egg product by heating the liquid egg for a time and at a temperature effective to reduce the population of viable microorganisms, the improvement comprising: admixing hydrogen peroxide with the liquid egg in an amount effective to increase the reduction of viable microorganisms under the conditions of heating; contacting the liquid egg with catalase to reduce the hydrogen peroxide concentration after heating; and removing free oxygen from the liquid egg, preferably by vacuum treatment. The liquid egg, both prior to and after pasteurization, is also new and provides improvements over the prior art.

BRIEF DESCRIPTION OF THE DRAWINGS

The invention will be better understood and its advantages will become more apparent when the following detailed description is read in conjunction with the accompanying drawing wherein:

The FIGURE is a flow diagram of the process described in Example 1.

DETAILED DESCRIPTION

The present invention will be described in terms of the pasteurization of a liquid, low cholesterol egg formulation comprised principally of egg white and preferably contains little or no egg yolk. Representative compositions of this type are exemplified in U.S. Pat. Nos. 3,840,683 and 3,911,144 to Strong and Redfern, U.S. Pat. No. 3,928,632 to Glaser and Ingerson, U.S. Pat. No. 4,971,027 to Huang, and European Patent Application 344,123 to Maley et al. The invention is not limited to compositions of this type and can be used with whole egg product formulations as disclosed by Swartzel et al in U.S. Pat. Nos. 4,808,425 and 4,957,759. Each of the above patent disclosures is incorporated by reference in its entirety.

Typically, low cholesterol liquid egg products have liquid egg whites as a major component with minor amounts of a variety of other ingredients, including water, vegetable oil, vitamins, minerals, emulsifiers, stabilizers, metal salts and/or organosulfur compounds as pasteurization aids, and coloring. An agent such as a xanthan gum can also be utilized to impart freeze-thaw stability to the liquid egg product.

It has now been discovered that, in addition to the effect which can be achieved by adding metal salts and/or organosulfur compounds to suppress the coagulation of egg protein during pasteurization, it is advantageous to employ hydrogen peroxide in significant amounts if catalase is employed to reduce the peroxide concentration and free oxygen is removed from the liquid egg product, preferably by in-line vacuum treatment prior to packaging.

It is preferred to employ coagulation suppressing polyvalent metal and/or organosulfur compounds to achieve the maximum suppression of coagulation to permit the greatest degree of kill of spoilage-causing and pathogenic organisms.

Preferably, the coagulation suppressing polyvalent metal compound is a salt of a metal selected from the group consisting of aluminum, iron, copper, nickel, manganese, cobalt, zinc, and cadmium. Most desirably, the metal comprises aluminum and is employed in an amount of from 0.0003 to 0.003 molar. The disclosure of U.S. Pat. No. 3,251,697 to Lineweaver and Cunningham is incorporated herein by reference.

The organosulfur compounds are desirably added to the egg in an amount effective to suppress coagulation, thereby permitting higher pasteurization temperatures and/or times. Typically, the organosulfur compounds will be used at a level of from 0.005 to 0.5 percent of the weight of the egg. Preferred amounts will be in the range of from 0.01 to 0.1 percent. This is disclosed by Rapp in copending U.S. patent application Ser. No. 07/686,911, filed Apr. 15, 1991.

Liquid egg products are employed for making scrambled eggs, omelets, quiches, and other egg-containing products. These products contain egg white and a number of other ingredients to enhance flavor and appearance. The egg white is responsible to a significant degree for providing the desirable organoleptic and functional characteristics of the liquid egg product. It is preferred that the principal protein source in the egg composition consist essentially of egg white. Other protein sources such as soya protein, whey, and casein derivatives, when present in the liquid egg product, seem to impart, in certain instances, an undesirable flavor and deleteriously affect the functional characteristics of the product. They may, however, be employed in products and amounts where their effect is not significantly discernible or otherwise detrimental.

The amount of egg white present in the liquid egg product itself may be from about 24 to about 99 percent by weight. Preferably, however, the amount of egg white present is from about 40 to 99 percent and most preferably the egg white is present at a level of about 95 to 99 percent by weight. Prior to heating, the egg desirably has a pH of less than 9.0, preferably above 6.5, typically, in the range of 7.5 to 8.5. Preferably, the egg white will have previously been pasteurized by a process that includes the use of hydrogen peroxide (i.e. Standard Brands and Armour processes, USDA, Egg Pasteurization Manual, ARS 74–78, pp. 19 et seq. and Egg Product Inspectors Handbook, AMS PY-Instruction No. 910, pp. 34 et seq.), because these processes destroy natural catalase present in egg white.

The water in the low cholesterol liquid egg product is used primarily to solubilize water soluble ingredients which are then blended into the egg product. In addition, the water imparts some degree of increased flowability to the product. The water is typically present in low cholesterol egg product in an amount of 0 to 5 weight percent, preferably about 0.5 weight percent.

Vegetable oil may be used and can be any edible vegetable oil such as corn, cottonseed, soybean, safflower, sunflower, peanut, rape seed, olive, and sesame oils, and the mixtures thereof, with corn oil being preferred. The amount of vegetable oil present in the liquid egg product may vary widely. However, at high oil levels, the liquid egg product becomes soft and mushy when scrambled. Another reason for keeping oil content low is that the presence of oil increases the calorie content of the low cholesterol liquid egg product. In place of vegetable oil, a fully or partially-digestible fat mimetic such as sucrose polyester or the like can be employed. Small amounts of oil also seem to impart certain subtle organoleptic characteristics of real eggs (e.g., mouth feel and texture) to the egg product. It is therefore preferred that the liquid egg product contain from about 0.25 to 13 percent by weight oil, to simulate the effect of fat naturally present in whole eggs.

If desired, the composition can also include yolk. Swartzel et al, in U.S. Pat. Nos. 4,808,425 and 4,957,759, disclose the preparation of shelf-stable whole egg products by high-temperature, short-time ultrapasteurization of liquid whole egg combined with aseptic packaging. In European Patent Application 344,123 Maley et al point out that whole eggs can withstand temperatures about 20° F. higher than egg white.

To achieve a low cholesterol product, containing yolk, the yolk can be processed to remove a portion, e.g. from 10 to 90 percent, of the natural fat and/or cholesterol content. This can be accomplished by any of the processes known to the art, for example, those of Fioriti et al in U.S. Pat. No. 4,103,040 and of Bracco et al in U.S. Pat. No. 4,333,959, the disclosures of which are incorporated herein by reference.

For a liquid egg product to be acceptable to the consumer, it should be colored so that it has the characteristic color of whole eggs. It is preferred that the colorant comprises a mixture of beta-carotene and approved F D & C food colorants (e.g., F D & C yellow No. 5 and No. 6) in suitable proportions and amounts to impart to the egg compositions the characteristic color of whole eggs. Beta-carotene is oil soluble and water insoluble, while F D & C yellow No. 5 and No. 6 are water soluble and oil insoluble. When an oil-soluble colorant or other ingredient is used in the product, it is recommended that it first be dissolved in a small amount of vegetable oil so that it can be dispersed substantially evenly throughout the liquid egg product.

The xanthan gum, which can be employed in the liquid egg product to impart freeze-thaw stability, is a complex polysaccharide derived from the microorganism *Xanthamonas campestris*. Preferably, xanthan gum is used in conjunction with a plurality of gums. It has been discovered that a blend of xanthan gum, guar gum, and carrageenan is particularly effective in imparting freeze-thaw stability, syneresis resistance, satisfactory viscosity, and suitable texture. The gum blend is present in the low cholesterol liquid egg product in amounts of 0.05 to 0.5 weight percent, preferably 0.21 weight percent. The constituents of the gum blend are present in the blend in amounts of 40 to 90 weight percent, preferably 55 weight percent xanthan gum, 10 to 50 weight percent, preferably 35 weight percent guar gum, and 0 to 25 weight percent, preferably 10 weight percent carrageenan. Although xanthan gum is non-gelling, the additional use of guar gum permits the low cholesterol egg product to form an interrupted gel which is less stringy or gummy than non-gelling compositions and achieves improved freeze-thaw stability and syneresis resistance compared to the individual gums.

The low cholesterol liquid egg ingredients can be blended by a variety of methods. A major objective is to minimize foaming, which egg whites easily induce when subjected to agitation. Preferably, foaming is minimized by blending all of the other ingredients into the egg whites with a suitable, low-aeration mixer such as a Tri-Blender TM mixer manufactured by Ladish Co., Inc., Tri-Clover Division, Kenosha, Wis. The beta-carotene, oil-soluble vitamins, other oil-soluble components, and the gums are all pre-blended and introduced through a port near the throat of the Tri-Blender TM mixer. Watersoluble ingredients are also pre-blended with water and added to the egg whites. Dry ingredients are added either separately or in pre-blended form.

According to the invention, the liquid egg mixture, with additives, is heat pasteurized in the presence of hydrogen peroxide, the hydrogen peroxide is reacted with catalase, free oxygen is removed, and the liquid egg is then packaged for refrigerated storage. Hydrogen peroxide is added to enhance the effect of the thermal processing. The hydrogen peroxide will be added in an amount effective to enhance reduction of viable organisms, typically at a concentration of from 30 to 2000 ppm, e.g. at least 250 ppm and preferably from 500 to 1500 ppm.

Pasteurization entails heating the liquid egg to a temperature and for a time effective to reduce the number of microbial organisms to effectively remove the threat of pathogenic organisms such as Salmonella and to extend the refrigerated storage life of the product. The heat treatment necessary to kill the microorganisms is, like that which causes coagulation of protein, a function of both time and temperature. Longer times require lower temperatures and higher temperatures permit shorter processing times.

The present invention enables achieving a better degree of microbial reduction while still avoiding the adverse results of undue coagulation of the liquid egg. The invention enables this by utilizing the effect of hydrogen peroxide but eliminating the adverse effects of both it and the diatomic oxygen which it produces. The heat treatment desirably causes at least "nine log cycle" (9D) reduction in the count of viable Salmonella organisms, i.e., the number is reduced 99.9999999%. And, the count of spoilage causing microbes is reduced sufficiently to provide at least two weeks storage at refrigerator temperature, i.e. 4° C. Preferred degrees of heat treatment will enable refrigerator storage without spoilage for from 1 to 12 months, most preferably greater than 3 months.

The desired degree of storage stability must be achieved without adversely affecting the liquid character of the egg. One measure of the degree of coagulation is the loss of soluble protein which can be measured by standard techniques (see for example: Hamid-Samini et al, J. Food Sci. 49:132 (1984). It is desired to maintain the loss of soluble protein to less than 20 percent, preferably less than 10 percent, and most desirably less than 5 percent.

To heat process a low cholesterol egg product of the type described above, the liquid egg is pumped through a suitable heat exchanger such as a Cherry-Burrell plate or Spiratherm TM heat exchanger to bring the temperature rapidly up to the desired level, e.g. at least about 58° C., and preferably within the range of from 60° to 67° C. (e.g. 61°-63° C.), at which it is held for the time effective at that temperature, e.g. 12 minutes or less, e.g. at least 3, and desirably 5 to 10 minutes. Rapid heating to the effective range and cooling from it best achieves pasteurization but yet preserves the liquid character of the egg, and minimizes soluble protein loss and viscosity increase.

According to the invention, the hydrogen peroxide can be added at any stage before heating, during heating, or during the hold time. It is preferred to add it after heating the liquid egg composition up to at least 54° C. and most preferably up to pasteurization temperature, but prior to any significant hold time at that temperature. It is preferred to heat the egg composition to a temperature effective to inactivate natural catalase activity prior to adding the hydrogen peroxide. Any natural catalase would inactivate hydrogen peroxide and render process control difficult.

After holding the liquid egg composition containing the hydrogen peroxide at a temperature (e.g., at least 58° C.) and for a time (e.g., at least 3 minutes) effective to reduce the population of viable organisms as necessary to meet the requirements of the storage conditions, the composition is cooled to a temperature below the heat denaturing threshold, e.g. below 55° C., preferably below 50° C. The cooling from pasteurization temperature to the lower temperature should occur as rapidly as possible.

Following initial cooling to say the range of 45° to 50° C., a sterile solution of catalase is introduced into and mixed with the liquid egg composition. This catalase can be obtained from any suitable source, for example GenenCor International, Inc., and is desirably employed in an amount effective to react with substantially all of the remaining hydrogen peroxide. Preferably, the catalase is added in stoichiometric excess of the amount of hydrogen peroxide added (e.g., 1 to 20% excess) to assure complete conversion of the peroxide to water and diatomic oxygen. The catalase can be sterilized by filtration, e.g. passing it through a 0.2 micron filter such as a Micropure Filtration, Inc. filter. The liquid egg composition is mixed, such as in an in-line mixer, following introduction of the catalase. The composition is held for a time sufficient to react with most of the hydrogen peroxide. Time periods of from about 5 minutes, e.g. about 3 minutes, are usually effective.

The conversion of the hydrogen peroxide with the catalase, generates diatomic oxygen in amounts which can adversely affect the quality of the product when stored under refrigerated conditions in the liquid state. It is necessary to remove the oxygen down to levels which will provide the desired storage stability. This can be achieved by subjecting the egg composition to vacuum and can be achieved by an in-line vacuum treatment. Some egg compositions tend to foam, especially when large amounts, e.g., greater than 250 ppm, of hydrogen peroxide are added. In these cases it may be desirable to add an antifoam material such as Dow Corning 1510US Silicone Antifoam in amounts effective to control the foaming.

Following these treatments, the liquid egg composition is preferably finally cooled to facilitate packaging. Cooling to less than about 10° C., e.g. 1 to 5° C., is effective for most purposes.

The processed liquid egg is then packaged by feeding it into a heat-sealable package, typically a polymer-coated fiberboard gusseted-top container. Other acceptable containers would include cups made of plastics such as polypropylene, other suitable materials or laminates, as well as rectangular packages composed of paper/aluminum foil laminates or plastic. Following filling, the container is sealed. Desirably, filling and sealing will be under aseptic conditions. The filled and sealed containers are then refrigerated. Products prepared and packaged in this manner will preferably be stable against spoilage at refrigerator temperature (4° C.) for at least 2 weeks, preferably at least 30 days, typically from 60 to 180 days. If desired, they can be frozen.

The following examples are presented to further illustrate and explain the invention and are not to be taken as limiting in any regard. Unless otherwise indicated, all parts and percentages are based on the weight of the composition at the indicated point in the process.

EXAMPLE 1

A refrigerator-stable liquid egg product is prepared employing the following formulation and processing equipment as schematically shown in the Figure.

| INGREDIENT | PARTS |
| --- | --- |
| Egg White | 99.134171 |
| Durkex 500 Vegetable Oil | 0.275 |
| Cloud (Titanium Dioxide) | 0.1525 |
| Calcium Sulfate | 0.07 |
| Xanthan Gum | 0.115 |
| Guar Gum | 0.069 |
| Vitamin Color Blend | 0.045 |
| Carrageenan | 0.023 |
| Vitamin/Mineral Premix | 0.008818 |
| Aluminum Sulfate Solution $Al_2(SO_4)_3 \cdot H_2O$) (42% in water) | 0.057761 |
| Color Iron Blend | 0.011005 |
| Folic Acid Solution | 0.002756 |
| PZ-44 Cysteine/Dextrose Blend (Foremost Foods, Inc.) | 0.09375 |
| Folic Acid Solution Composition: | |
| Distilled Water | 95.0 |
| Folic Acid | 2.90 |
| Sodium Bicarbonate | 2.10 |

The first stage in the process involves the separate preparation of an egg phase and an oil phase, followed by combining them to form the egg composition for pasteurizing. The oil phase is prepared by heating the oil to about 43° C. with stirring, adding the guar gum, xanthan gum and the carrageenan and a blend of the other oil-soluble ingredients (vitamin color blend) and holding under agitation at about 43° C. Separately, the folic acid solution, aluminum sulfate, vitamin/mineral premix, and color iron blend are mixed into the egg white in vessel 10 by means of a Tri-Blender ™ mixer 12 or other high-shear/low-foaming mixer. The pH of the batch is adjusted to a desirable range for heat processing stability and bactericidal effect, i.e. pH of 7 to 9.5, preferably 8.0. This can be accomplished with lactic acid or other suitable food acids. If necessary, a suitable alkaline material such as potassium carbonate may be used to adjust pH. The batch is held at 0° to 12° C. To the resulting blend, the oil phase blend is added slowly to prepare the egg composition for pasteurization and packaging.

The egg composition is fed from vessel 10 by pump 14 to heat exchanger 16 which raises the temperature of the composition to about 2° C. at which catalase naturally present in the egg is inactivated. The heated egg composition is then passed via line 18. The composition is homogenized in a two-stage homogenizer 19 (1000 psig/500 psig) and hydrogen peroxide (1000 ppm) is added at 20. The composition is then mixed in inline mixer 21 and passed through holding tube 22 for a residence time of 6 minutes. The pasteurized egg composition is then cooled to about 45° C. in heat exchanger 24 and passed to line 26 wherein sterilized catalase is injected and then mixed by in-line mixer 27. Filter 28 in catalase in line 30 is of a pore size (e.g. 0.2 micron) effective to remove any microbiological contaminants. Following the mixer, the egg composition is held in line 32 for about 3 minutes prior to in-line vacuum treatment at 33 to remove free oxygen. The composition is then chilled at 34 to about 5° C. and packaged in sealed containers at 36 under aseptic conditions.

The product is stable at refrigerator temperature (4° C.). for 3 months.

The above description is for the purpose of teaching the skilled worker how to practice the invention and is not intended to detail all of the obvious modifications and variations of it which, while not specifically set forth, are included within the scope of the invention which is defined by the following claims.

What is claimed is:

1. A process for pasteurizing liquid egg comprising:
    adding a coagulation suppressing composition selected from the group consisting of polyvalent metal compounds, organosulfur compounds and mixtures of these to the liquid egg and adjusting the pH as necessary to a value within the range of from 7.5 to 8.5, for heat processing stability;
    adding hydrogen peroxide to the liquid egg in an amount of at least 30 parts per million;
    holding the liquid egg at a temperature of at least 58° C. for a time effective to reduce the population of viable organisms sufficiently to obtain an at least 9D reduction in the count of viable Salmonella organisms and to obtain stability for at least two weeks storage at refrigerator temperature without adversely affecting the liquid character of the egg;
    contacting the liquid egg with catalase in an amount and for a time effective to convert hydrogen peroxide to water and diatomic oxygen; and
    removing oxygen released by reaction of the catalase with the hydrogen peroxide.

2. A process according to claim 1 wherein hydrogen peroxide is added following heating the egg to a temperature of at least 54° C.

3. A process according to claim 2 wherein the hydrogen peroxide is employed at a level of from 250 to 2000 ppm.

4. A process according to claim 3 wherein the catalase is employed at a level effective to react with all of the added hydrogen peroxide.

5. A process according to claim 1 wherein a coagulation suppressing polyvalent metal compound comprising a salt of a metal selected from the group consisting of aluminum, iron, copper, nickel, manganese, cobalt, zinc, and calcium, is employed in an amount of from 0.0003 to 0.003 molar.

6. A process according to claim 1 wherein a coagulation suppressing organosulfur compound is employed at a level of from 0.005 to 0.5 percent by weight of the egg.

7. A process according to claim 6 wherein the coagulation suppressing organosulfur compound is L-cysteine or a precursor of it and is employed at a level of from 0.01 to 0.1 percent by weight of the egg.

8. A process according to claim 4 wherein the egg comprises albumen.

9. A process according to claim 8 wherein the egg further comprises yolk.

10. In a process for preparing a pasteurized liquid egg product by heating a liquid egg composition to a pasteurization temperature and holding the composition at that temperature for a time period effective to reduce the population of viable microorganisms, the improvement comprising:

adding a coagulation suppressing composition selected from the group consisting of polyvalent metal compounds, organosulfur compounds and mixtures of these, to the liquid egg, adjusting the pH as necessary to within the range of from 6.5 to 9.0 to maintain heat stability of the egg white during heat processing to reduce the population of viable microorganisms, heating to a pasteurization temperature of at least 58° C. and homogenizing the resulting liquid egg composition;

then, mixing hydrogen peroxide with the liquid egg composition prior to holding the composition at the pasteurization temperature;

heating the egg composition to a pasteurization temperature of at least 58° C. and holding the composition about that temperature for a time period effective to obtain an at least 9D reduction in the count of viable Salmonella organisms and to obtain stability for at least two weeks storage at 4° C.;

following the holding time period, cooling the egg composition to a temperature in the range for effective catalase action and mixing catalase into the composition;

permitting sufficient time for substantially all of the hydrogen peroxide to be reduced to water and diatomic oxygen; and subjecting the composition to vacuum to remove oxygen.

11. A process according to claim 10 wherein the concentration of hydrogen peroxide is at least 500 ppm and the egg composition further comprises L-cysteine or a precursor of it and a coagulation suppressing polyvalent metal salt.

12. A process according to claim 10 wherein the egg composition containing the hydrogen peroxide is held at a temperature of from 60° to 67° C. for from 3 to 10 minutes prior to cooling to a temperature of below at least 55° C. for introduction of said catalase.

13. A process according to claim 10 wherein the vacuum is applied by in-line means following a time period of from 0.5 to 5 minutes after addition of the catalase to the egg composition.

14. A process according to claim 13 wherein the egg composition is heated to a temperature and for a time effective to inactivate natural catalase before introduction of the hydrogen peroxide.

15. A process for pasteurizing liquid egg comprising:

adding at least one coagulation suppressing compound selected from the group consisting of polyvalent metal compounds and organosulfur compounds, and adjusting the pH as necessary to within the range of from 6.5 to 9.0 for heat processing stability;

heating to a temperature of at least 54° C. and homogenizing the resulting heated liquid egg composition;

following homogenization, mixing hydrogen peroxide with the liquid egg composition;

holding the liquid egg composition containing the hydrogen peroxide at a temperature of at least 58° C. for a time period effective to reduce the population of viable organisms sufficiently to obtain an at least 9D reduction in the count of Salmonella organisms and the count of spoilage-causing microbes sufficiently to provide at least two weeks storage at refrigerator temperature when packaged in sealed containers under aseptic conditions;

following the holding time period, cooling to a temperature in the range for effective catalase action and mixing catalase into the composition;

permitting sufficient time for substantially all of the hydrogen peroxide to be reduced to water and diatomic oxygen; and subjecting the composition to in-line vacuum to remove oxygen after from 0.5 to 5 minutes following the addition of catalase.

16. A process according to claim 15 wherein the hydrogen peroxide is added in an amount effective to bring the concentration in the egg composition to at least 250 ppm.

17. A process according to claim 16 wherein the concentration of hydrogen peroxide is at least 500 ppm and the egg composition comprises L-cysteine or a precursor of it and a coagulation suppressing polyvalent metal salt.

18. A process according to claim 15 wherein the egg composition containing the hydrogen peroxide is held at a temperature of from 60° to 67° C. for from 3 to 10 minutes prior to cooling to a temperature of below at least 55° C. for introduction of said catalase.

* * * * *